Figures 1, 2:
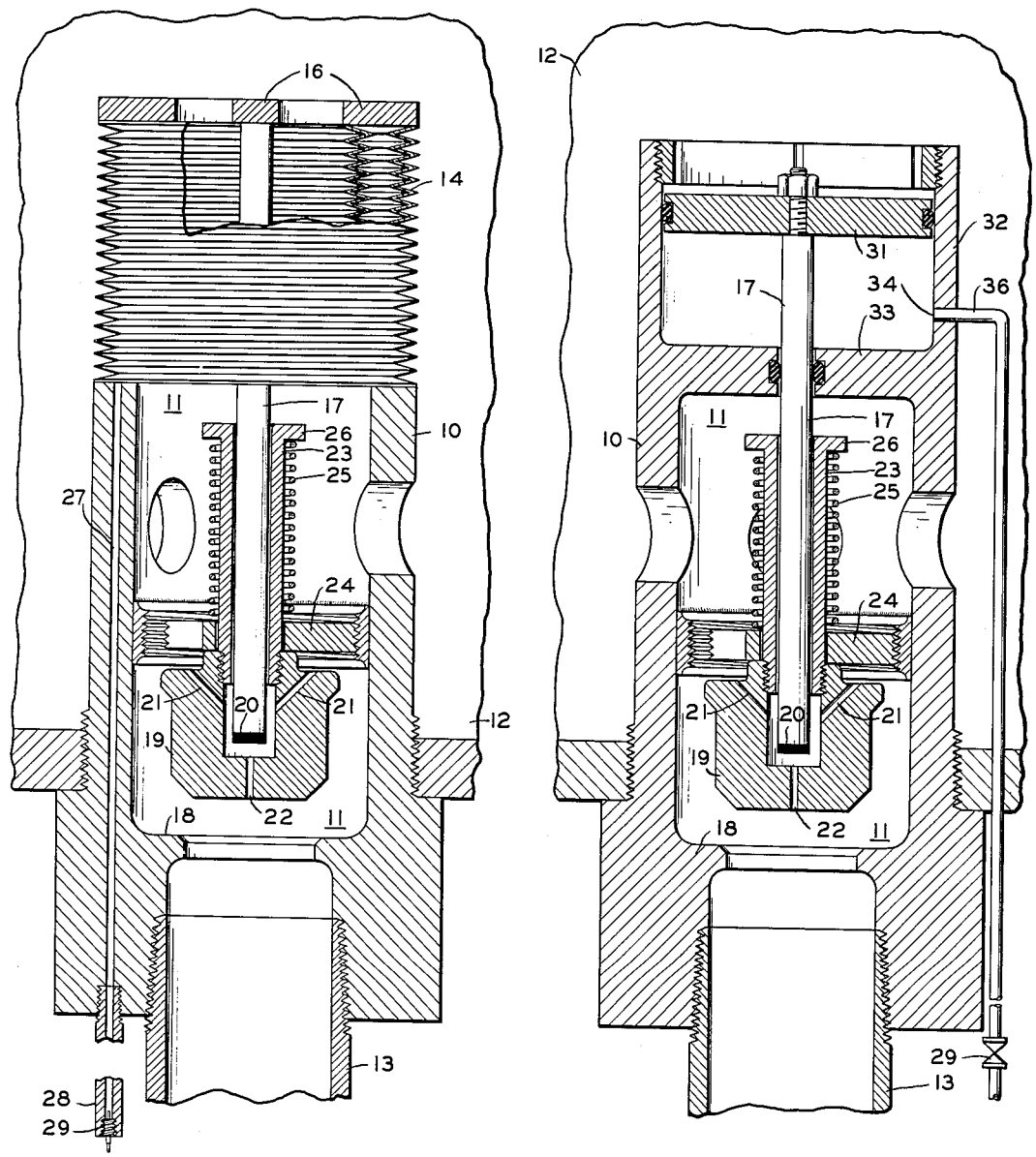

INVENTOR.
H. J. PANKRATZ

ATTORNEYS

United States Patent Office 2,740,418
Patented Apr. 3, 1956

2,740,418

COMBINED EXCESS FLOW AND SHUT OFF VALVE

Howard J. Pankratz, Bartlesville, Okla., assignor to Phillips Petroleum Company, a corporation of Delaware Application August 6, 1951, Serial No. 240,541

9 Claims. (Cl. 137—68)

This invention relates to excess flow valves. In one of its more specific aspects it relates to a valve mechanism which is capable of operating automatically to completely close a liquid outlet under conditions of excess flow and which may be operated by remote control to cause positive opening and positive closing of a liquid outlet at will.

One preferred use of this invention is as an internal excess flow valve for outlets of liquid petroleum gas containers, tank trucks, etc., but it is not limited to such use. It may be used in fluid outlet lines from any vessel containing liquid, gas or vapor under pressure.

Use of excess flow valves of conventional design in combination with outlet lines of liquid petroleum gas containers has the great disadvantage of permitting fluid flow in the outlet line between the excess flow valve, customarily installed within the container at the entrance of the outlet line, and a terminal hand valve with which the outlet line is usually closed when the excess flow valve is in the closed position. A partial break or leak between these points may result in sufficient flow when the excess flow valve is closed to bring about a fire or explosion hazard and if this flow is prolonged, it will cause waste and dissipation of much valuable material.

An excess flow valve which can be installed in containers at the junction of a fluid outflow line and which can be positively completely closed when a leak is detected or when line breakage occurs is a very desirable improvement. As indicated hereinbefore excess flow valves of conventional design do not completely shut off all flow. In excess flow valves of conventional design there is provided a pressure equalizing port or orifice in the valve plug. When the loss in pressure in the outlet line attached to the excess flow valve (or when the pressure drop across the excess flow valve) is caused by a temporary excessive demand, it is the function of the equalizing port or orifice to permit equalization of the pressure across the valve, after the valve has closed, so that the excess flow valve may be permitted to open again. Obviously if the pressure drop across the excess flow valve or loss in pressure is caused by a complete break or a leak of sufficient magnitude in the outflow line, the pressure across the excess flow valve will not be equalized until the necessary repairs have been made. In the meanwhile fluid is continually escaping through the equalizing port and in a relatively short time, especially in the case of a complete break, the entire contents of the tank may be discharged and lost through the pressure equalizing orifice. Furthermore, in the case of liquified petroleum gas being discharged into a closed space, a serious hazard will be created.

It is an object of this invention to provide an excess flow valve mechanism which may be positively, completely closed at will or automatically closed and which may be opened at will, even by remote control.

A further object is to provide means for positively opening and closing an excess flow valve by remote control.

Another object is to provide a simplified excess flow valve mechanism which is rugged, foolproof and cheap in construction and which has the advantageous arrangement and combination of parts as shown and described hereinafter.

A special feature of this invention resides in the combination of an excess flow valve comprising a valve plug, a valve seat, a member adapted to resist seating of the valve plug and means comprising a pressure actuated mechanism, for positively opening and closing the valve.

Other objects, features and advantages will be apparent and suggest themselves to those skilled in the art from the accompanying discussion and disclosure.

In accordance with my invention I have provided an improved excess flow valve for dispensing fluid and which is capable of completely terminating fluid flow therethrough at will or automatically in the event of breakage in the outlet or dispensing system or the occurrence of fire or high temperature in close proximity to the excess flow valve and/or dispensing system.

More specifically the invention comprises an excess flow valve which is capable of acting not only as an excess flow valve but also as a shut-off valve and also having the added feature that under conditions of excess flow caused by outlet line rupture or exposure of dispensing system to fire or high temperature all flow from the dispensing vessels is shut off and stopped. As an added feature the above-indicated flow stoppage may be accomplished either automatically or at will.

The invention will be better understood and the method by which the above is accomplished will become apparent from the following discussion made with reference to the accompanying drawings Fig. 1 and Fig. 2 wherein:

Fig. 1 is a schematic view of one preferred embodiment of the invention and wherein Fig. 2 is a schematic drawing of another preferred embodiment of the invention.

Referring now to Fig. 1, a body 10 having a fluid conduit 11 therethrough is shown inserted into a tank or other vessel 12 and in communication with outlet line 13. Attached to the upper portion of body 10 and preferably within the enclosure of vessel 12 is pressure responsive device 14 such as a diaphragm or bellows. To bellows 14 is attached a thrust transmitting member 16 which may be a bar or spider and which is fixedly attached to one end of valve stem 17. A valve seat 18 is provided within body 10 preferably at the outlet end of conduit 11. Valve seat 18 may be a metal surface accurately machined and finished or made up of suitable resilient material so as to provide a good contact with a valve plug which may be placed against it.

Positioned in conduit 11 and adapted to seat on valve seat 18 is valve plug 19. Valve plug 19 is adapted to fit over the lower end of valve stem 17 and contains an orifice 22 therethrough. Valve plug 19 also contains one or more openings 21 preferably in the upstream end thereof, allowing full communication for fluid in conduit 11 to orifice 22.

Valve plug 19 is fitted or attached, as by means of threads, to guiding member, valve stem 23 which is positionally spaced and slidably supported, by member 24 which may be a spider or of such construction and design as to allow flow of fluid in conduit 11 therethrough. Member 23 may be of any desired design which provides adequate support and guidance of valve stem 17. Externally and concentrically surrounding member 23 is resilient means 25 such as a compression spring which is positioned so as to receive thrust from the collar 26 of member 23 and bears upon member 24. Valve stem 17 is preferably fitted at the free lower end thereof with suitable resilient material 20 so as to assure complete closure on orifice 22 when the valve stem closes thereon.

Extending completely through the length of valve body 10 is conduit 27 communicating with the interior of bellows 14 at one end and with tube 28 at its other end. Tube 28 may be of any predetermined and/or desired length and may be closed with a pressure retaining device 29 such as a valve or common Dill or check valve.

Body 10 is attached to any suitable vessel or conduit 12 and in normal operation (when the valve is open) the interior of vessel or conduit 12 is in communication via fluid conduit 11 with outlet line 13. Spring 25 will tend to keep valve plug 19 away from its seat 18 and allow flow therethrough. If due to excessive fluid demand, loss of pressure within outlet conduit 13 occurs, the pressure within vessel 12 on the upstream surface of valve plug 19 will tend to restrict and shut off the fluid flow through the valve by urging valve plug 19 to close on its seat 18. However it should be noted that valve stem 17 does not descend at this time upon orifice 22 to seal off the pressure equalizing port.

If however outlet line 13 should be fractured, tube 28 in close association and intimate contact therewith will also be fractured thereby resulting in a release of the pressure within bellows 14. Bellows 14 will collapse and will in turn positively move valve stem 17 downward to close orifice 22, as well as to cause valve plug 19 to seat. Without a release in pressure within bellows 14 the assembly acts in the usual manner as an excess flow valve.

Whenever valve stem 17 is in an extended position as shown, bellows 14 may be so designed that the ambient pressure (tank pressure) tends to collapse the bellows thereby forcing valve stem 17 and its resilent seat 20 over orifice 22 and further urging valve plug 19 against action of spring 25 to seat 18 thereby completely stopping flow of fluid through the valve. Bellows 14 may also be equipped with a spring which will tend to maintain bellows 14 in a collapsed position.

Fig. 2 represents another embodiment of the excess flow valve of the invention and the same parts of the excess flow valves shown in Figs. 1 and 2 bear the same identifying numbers. Fig. 2 is similar to Fig. 1 except that bellows 14 is replaced by a pressure-responsive means comprising a piston 31 attached to valve stem 17 and wherein the inner wall of the upper portion 32 of valve body 10 defines a cylinder within which said piston operates. The lowest point of travel of the piston being defined by partition 33 which contains a passageway, which partition may be an integral part of valve body 10 if desired.

Appropriate pressure retaining or fluid sealing means such as an O-ring are associated with the passageway of said partition and with said piston to maintain any desired pressure within the space defined by said piston and said partition. Valve stem 17 extends through the passageway and is connected at the upstream and thereof to piston 31. Pressure may be applied to piston 31 through opening 34, located within the wall 32 and preferably adjoining partition 33 via conduit 36 shown as located outside of valve body 10. The other end of conduit 36 terminates with a pressure retaining device 29. If desired conduit 36 may be located within valve body 10 and/or extending at least through a portion thereof.

The operation of the improved excess flow valve of the invention is simple. Whenever it is desired to move the excess flow valve plug 19 from a completely closed position i. e. with bellows 14 collapsed or when piston 31 is down close to partition 33, fluid pressure via conduit 27 (or 36) is applied to expand bellows 14 or move piston 31 upstream. The pressure may be applied with a small hand pump or any other suitable pressure generating source. Expansion of the bellows or upstream movement of the piston as a result of the applied pressure will place valve stem 17 in the open position as shown in Figs. 1 and 2. Obviously if line 13 is being put into service initially, valve plug 19 will not lift from its seat immediately at this time since there will prevail a considerable pressure difference between line 13 and vessel 12. However, as soon as the pressure is equalized between line 13 and vessel 12 as a result of flow through ports 21 and pressure-equalizing orifice 22, valve plug 19 will be unseated and the valve assembly will function as an excess flow valve. Should outlet line 13 and line 27 (or 36) associated therewith be broken, valve plug 19 will immediately be seated due to the decrease in pressure within line 13 and bellows 14 or piston and cylinder 31 and 32 and at the same time valve stem 17 will descend upon and seal off orifice 22 due to the action of collapsing bellows 14 or descending piston 31 which is moved downward due to pressure within tank 12 to which it is exposed.

The invention comprises in combination with a tank and/or suitable dispensing system containing fluid under pressure an outlet valve means having an equalizing port therein and being suitable for interrupting fluid flow under conditions of excess flow or excessive pressure drop across said valve means. My valve means is adapted to receive a thrust member, such as a valve stem provided at the end adjacent the equalizing port with a valve head or seating surface slideably fitted therein, adapted and positioned to seal off the pressure equalizing port of said valve means. The thrust member is actuated by a suitable means, as a pressure responsive device such as bellows or piston and cylinder, for movement off and onto said equalizing port. The actuating means is adapted so as to actuate and close said thrust member over the equalizing port in the event of a break in said outlet dispensing system or when said system is exposed to flame or high temperature. The thrust member is positioned within said valve means which is adapted to receive the thrust member therein. The thrust member is adapted so as to positively move a sealing member such as a valve plug which is adapted to function in the well-known manner of an excess flow valve upon a sudden drop in pressure.

Movement of the above-described thrust member is effected by said actuating means upon application of pressure or release of pressure effective upon said actuating means. Pressure upon or release of pressure from said actuating means may be effected through a conduit in communication therewith. If it is desired to apply pressure to said actuating means a pressure transmitting fluid is passed thereinto via said conduit. Similarly, if it is desired to release pressure from said actuating means, pressure transmitting fluid is removed or released via said conduit.

The pressure-transmitting fluid conduit (lines 27 or 36) as employed in combination with the excess flow valve of this invention and as employed in association therewith is an important and useful feature. The conduit is in close proximity and is intimately associated with and preferably is in direct contact with the fluid dispensing system on the outlet side of the excess flow valve of this invention so that if a line in the dispensing system is broken or severely damaged the pressure-transmitting fluid conduit will also be broken. The conduit may be of any desired length depending upon the length and size of the dispensing system to be protected. When a break or rupture occurs in the dispensing system the conduit intimately associated therewith will also be broken or ruptured, resulting in a release of the pressure transmitting fluid therein and thereby causing a drop in the pressure within actuating means (bellows) and permitting the thrust member upon collapse of pressure-responsive means (bellows) to close the excess flow valve and at the same time to seal off any equalizing port therein. It is of course within the scope of this invention to make the conduit containing the pressure transmitting fluid out of easily breakable and/or fusible material so that the excess flow valve is completely closed when a sudden severe shock is experienced by or ruptures the outlet dispensing system and the pressure-transmitting fluid conduit with which it is associated or when the conduit is ruptured due to its exposure to high temperature and/or flame. The pressure transmitting conduit may be located as an integral part of the excess flow valve assembly or outside thereof or it may be located within or without the outlet dispensing system.

Many obvious changes in construction will be apparent to those skilled in the art upon study of this disclosure without departing from the spirit or scope of this invention.

I claim:

1. A valve body with a first fluid flow conduit therein; a valve seat intermediate the upstream and downstream ends of said fluid flow conduit; foraminous positioning means intermediate the ends of and located within said first fluid flow conduit; a first hollow valve stem slidably extending through said positioning means and having an outwardly turned collar member on the upstream end; a valve plug cooperating with said seat and having a pressure equalizing orifice therethrough and connected to said hollow valve stem on the downstream end; a resilient member compressed between said collar member and said positioning means; a second valve stem slidably supported within said first valve stem and extending from beyond the upstream end of said valve body toward the downstream end of said valve body; a pressure fluid responsive means attached to the upstream end of said valve body; a thrust transmitting member connected to the upstream end of said second valve stem and operatively connected to said pressure responsive means; a seating surface on the downstream end of said second valve stem, said surface being adapted to close said pressure equalizing orifice upon downstream movement of said thrust member; a second conduit in communication with and connected to said pressure fluid responsive means at one end and a pressure fluid retaining means on the other end.

2. The apparatus according to claim 1 wherein the second conduit passes through the wall of said valve body from the downstream end to the upstream end.

3. The apparatus according to claim 1 wherein the pressure fluid responsive means is a bellows.

4. A valve body with a first fluid flow conduit therein; outlet distributing system including an outlet conduit attached to the downstream side of said valve body; a valve seat intermediate the upstream and downstream ends of said fluid flow conduit; foraminous positioning means intermediate the ends of and located within said first fluid flow conduit; a first hollow valve stem slidably extending through said positioning means and having an outwardly turned collar member on the upstream end; a valve plug cooperating with said seat and having a pressure equalizing orifice therethrough and connected to said hollow valve stem on the downstream end; a resilient member compressed between said collar member and said positioning means; a second valve stem slidably supported within said first valve stem and extending from beyond the upstream end of said valve body toward the downstream end of said valve body; a pressure fluid responsive means attached to the upstream end of said valve body; a thrust member connected to the upstream end of said second valve stem and operatively connected to said pressure responsive means; a seating surface on the downstream end of said second valve stem, said surface being adapted to close said pressure equalizing orifice upon downstream movement of said thrust member; a second conduit at least as frangible as said outlet conduit in communication with and connected to said pressure fluid responsive means at one end and a pressure fluid retaining means on the other end and said second conduit lying adjacent to said outlet distributing system.

5. A valve body with a first vertical fluid flow conduit and having in the upper section thereof a partition with a passageway therethrough defining the upstream end of said fluid flow conduit; a piston head located within said valve body above said partition; sealing means located between said valve body and said piston head; a valve seat intermediate the upstream and downstream ends of said fluid flow conduit; foraminous positioning means intermediate the ends of and located within said first fluid flow conduit above said seat; a first hollow valve stem slidably extending through said positioning means and having an outwardly turned collar member on the upstream end, a valve plug cooperating with said seat and having a pressure equalizing orifice therethrough and connected to said hollow valve stem on the downstream end; a resilient member compressed between said collar member and said positioning means; a second valve stem slidably supported within said first valve stem and extending from beyond the upstream end of said first fluid conduit toward the downstream end of said valve body; sealing means located on the inner surface of said passageway, said valve stem extending through said passageway and in contact with said sealing means and having the other end attached to said piston head; a seating surface on the downstream end of said second valve stem, said surface being adapted to close said pressure equalizing orifice upon downstream movement of said piston head; a second conduit in communication with and connected to the inside of said valve body immediately above said partition and a pressure fluid retaining means on the other end.

6. A valve body with a first fluid flow conduit therein; a valve seat intermediate the upstream and downstream ends of said fluid flow conduit; foraminous positioning means intermediate the ends of and located within said first fluid flow conduit; a first hollow valve stem slidably extending through said positioning means; a valve plug cooperating with said seat and having a pressure equalizing orifice therethrough and connected to said hollow valve stem on the downstream end; a resilient member operatively connected to said hollow valve stem so as to urge said valve plug into a retracted position; a second valve stem slidably supported within said first valve stem and extending from beyond the upstream end of said valve body toward the downstream end of said valve body; a pressure fluid responsive means attached to the upstream end of said valve body; a thrust transmitting member connected to the upstream end of said second valve stem and operatively connected to said pressure fluid responsive means; a seating surface on the downstream end of said second valve stem, said surface being adapted to close said pressure equalizing orifice upon downstream movement of said thrust member; a second conduit in communication with and connected to said pressure fluid responsive means at one end; and a pressure retaining means on the other end.

7. A pressure controlled excess flow valve comprising, in combination, a valve body with a first fluid flow conduit therein; a valve seat intermediate the upstream and downstream ends of said first fluid flow conduit; a valve plug cooperating with said seat and having a pressure equalizing orifice therethrough, said valve plug being slidably supported within said valve body; a resilient member operatively connected to said valve plug so as to urge said valve plug into a retracted position; a pressure responsive means on the upstream end of said valve body and having the side thereof opposite from the valve plug open to the exterior of said valve body; a thrust member slidably supported within and independently slidable with relation to said valve plug and attached at its upstream end to said pressure responsive means, said thrust member upon downstream movement thereof being adapted to close said pressure equalizing orifice; and a second conduit having one end communicating with and connected to the other side of said pressure responsive means and having a pressure retaining means at the other end.

8. The apparatus according to claim 7 wherein the pressure responsive means is a bellows.

9. The apparatus according to claim 7 wherein the pressure responsive means is a cylinder and piston combination.

References Cited in the file of this patent

UNITED STATES PATENTS

| | | |
|---|---|---|
| 623,934 | Wilson | Apr. 25, 1899 |
| 821,867 | Farmer | May 29, 1906 |
| 1,093,585 | Hoffman | Apr. 14, 1914 |
| 1,780,387 | Hart | Nov. 4, 1930 |
| 2,200,226 | Larson | May 7, 1940 |
| 2,367,662 | Baxter | Jan. 23, 1945 |
| 2,591,060 | Garretson | Apr. 1, 1952 |
| 2,611,382 | Kuemmerlein | Sept. 23, 1952 |